No Printed Specification Available
9431X
S. Davis,
Oscillating Pump,
Patented Feb. 25, 1836.
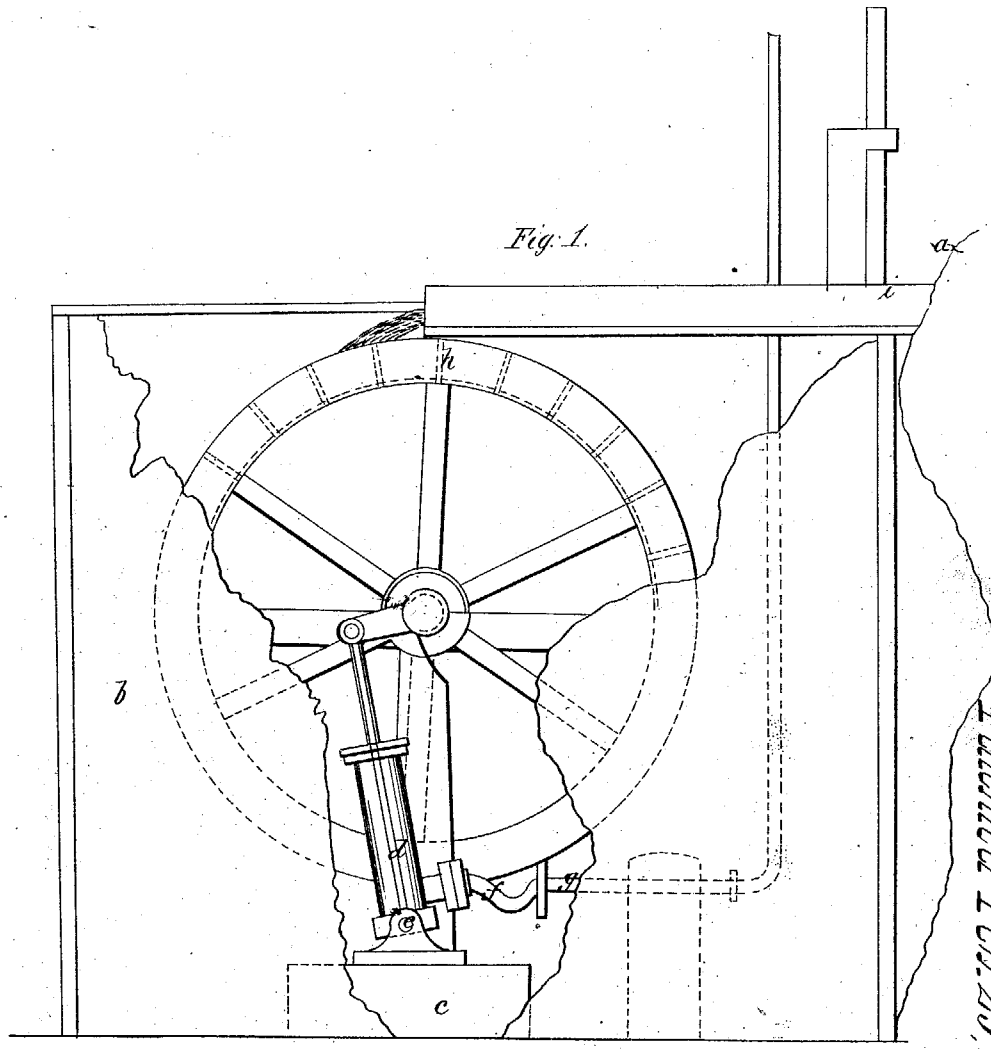
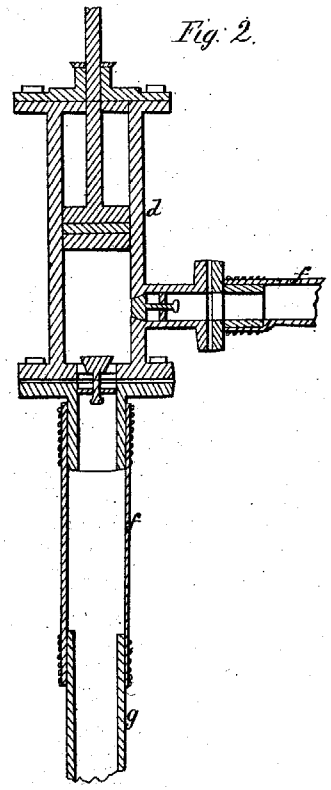
N. PETERS, PHOTO-LITHOGRAPHER, WASHINGTON, D. C.

2/25/1836 9431X

Feb. 25. 1836

Sampson Davis of Derby Vermont
Letters Patent

The Schedule referred to in these Letters Patent and making part of the same containing a description in the words of the said Sampson Davis himself of his improvement in the vibrating pump for raising and conveying Water.

To all persons to whom these presents shall come Sampson Davis of Derby in the County of Orleans and State of Vermont Gentleman Sends Greeting. Be it known that I the said Sampson Davis have invented constructed made and applied to use a new and useful improvement in the mode of raising and conveying water by means of a machine called "Davis' vibrating pump" specified in the words following Viz. This improvement consists in raising and conveying water by means of a small forcing pump attached to a water wheel placed within a box which I call the wheel house. "This wheel house" I place near a brook or spring by inserting it into the ground to a depth sufficient to secure it from frost and high water. In the wheel house I make a small cistern into which I put the pump so constructed as to turn or vibrate on or about its lower extremity on two pivots, one on each side in consequence of the action of the crank of the wheel upon the piston Rod. To this pump at the aperture through which the water is discharged I attach a piece of hose of such length as not to impede the vibrating motion of the pump. This hose I fix to any suitable pipe or aqueduct through which the water may be conducted to the place required. I make the wheel two feet diameter more or less. And the other parts of proper proportions say width of buckets nine inches. depth of the same three inches. Sweep of the crank two inches. The cylinder of the pump is about nine inches long and one and a half inches calibre. The wheel is propelled by water taken from the brook or spring and carried onto the wheel by a spout or pipe or penstock. The water 2/25/1836 9431x

394.

in the cistern is furnished from the same source or from another if convenient. What I claim as a new and useful improvement is a new employment of principles in the method of raising and conveying water by means of the "vibrating pump" and I claim no more. In testimony that the above is a true Specification of my said improvement as above described, I have hereunto set my hand the twenty second day of December AD 1835.

Exd. Witnesses
1836. Simon Davis Jr
Lem<sup></sup>l Richmond

Sampson Davis (50 [illegible])

(February 25. 1836.)